(12) United States Patent
Berg et al.

(10) Patent No.: US 9,339,902 B2
(45) Date of Patent: May 17, 2016

(54) DEVICE FOR DISMANTLING OF CHOSEN PARTS OF ASSEMBLED PALLETS

(75) Inventors: Karl-Johan Berg, Åhus (SE); Bengt Magnusson, Örkelljunga (SE); Per Danielsson, Klippan (SE)

(73) Assignee: YASKAWA NORDIC AB, Torsas (SE)

(*) Notice: Subject to any disclaimer, the term of this patent is extended or adjusted under 35 U.S.C. 154(b) by 220 days.

(21) Appl. No.: 13/988,165

(22) PCT Filed: Nov. 18, 2011

(86) PCT No.: PCT/SE2011/051386
§ 371 (c)(1),
(2), (4) Date: Jun. 10, 2013

(87) PCT Pub. No.: WO2012/067581
PCT Pub. Date: May 24, 2012

(65) Prior Publication Data
US 2013/0255077 A1 Oct. 3, 2013

(30) Foreign Application Priority Data
Nov. 19, 2010 (SE) .................................. 1051215

(51) Int. Cl.
*B23P 19/04* (2006.01)
*B25J 11/00* (2006.01)

(52) U.S. Cl.
CPC .............. *B23P 19/041* (2013.01); *B25J 11/00* (2013.01); *Y10T 29/534* (2015.01)

(58) Field of Classification Search
CPC ................... Y10T 29/49718; Y10T 29/53317; Y10T 29/49721; Y10T 29/53252; Y10T 29/5139; Y10T 29/53239; Y10T 29/49822; B23P 19/041; B25J 11/00
See application file for complete search history.

(56) References Cited

U.S. PATENT DOCUMENTS

| 2,593,843 | A | * | 4/1952 | Cannon | 29/33 R |
|---|---|---|---|---|---|
| 3,869,780 | A | * | 3/1975 | Ginnow et al. | 83/477 |
| 4,152,819 | A | * | 5/1979 | Conkle | 29/252 |

(Continued)

FOREIGN PATENT DOCUMENTS

| DE | 4435574 C1 | 6/1996 |
|---|---|---|
| EP | 0943394 A2 | 9/1999 |

(Continued)

OTHER PUBLICATIONS

International Search Report PCT/ISA/210 for PCT/SE2011/051386 dated Feb. 16, 2012.

*Primary Examiner* — Richard Chang
(74) *Attorney, Agent, or Firm* — Harness, Dickey & Pierce PLC (57) ABSTRACT

The invention concerns a device for dismantling of chosen parts of assembled pallets, said device including a support frame, that carries a first and a second dismantling station, into which pallets are insertable. The first dismantling station comprises at least one knife, which can be driven in between chosen outer parts of a base of a pallet in order to separate at least some of these parts. The second dismantling station comprises at least one knife, which can be driven in between chosen inner parts of a base of a pallet or between outer parts of a deck of a pallet in order to separate any of these parts. The device also comprises a multiple-axle robot, which is arranged to feed pallets into and out of the device and to position said pallets in relation to the knifes of both dismantling stations of the device.

19 Claims, 6 Drawing Sheets

(56) References Cited

U.S. PATENT DOCUMENTS

| | | | | |
|---|---|---|---|---|
| 4,320,570 | A | * | 3/1982 | Williams .................. 29/564.3 |
| 4,392,403 | A | | 7/1983 | Martindale, Jr. |
| 4,586,235 | A | | 5/1986 | Benvenuto |
| 5,105,526 | A | | 4/1992 | Dykstra et al. |
| 5,243,751 | A | * | 9/1993 | Dykstra et al. .............. 29/564.3 |
| 5,848,459 | A | * | 12/1998 | Minick ...................... 29/426.5 |
| 7,117,586 | B2 | * | 10/2006 | Dykstra et al. ................ 29/772 |
| 7,954,240 | B2 | * | 6/2011 | Holliger ..................... 29/897.31 |
| 2007/0107212 | A1 | | 5/2007 | Holliger |
| 2007/0108682 | A1 | | 5/2007 | Holliger |

FOREIGN PATENT DOCUMENTS

| | | |
|---|---|---|
| EP | 1636104 A1 | 3/2006 |
| WO | WO-94/07647 A1 | 4/1994 |
| WO | WO-00/78499 A1 | 12/2000 |

* cited by examiner

DEVICE FOR DISMANTLING OF CHOSEN PARTS OF ASSEMBLED PALLETS

This application is the national phase under 35 U.S.C. § 371 of PCT International Application No. PCT/SE2011/051386 which has an International filing date of Nov. 18, 2011, which claims priority to Swedish patent application number 1051215-0 filed Nov. 19, 2010.

TECHNICAL FIELD

The present invention relates to a device for dismantling of chosen parts of assembled pallets, each comprising a deck layer, which includes parallel deck boards arranged at given distances in relation to each other, a bottom layer, which is in parallel with the deck layer and includes parallel bottom boards, which are arranged at given distances in relation to each other, and an intermediate layer, which is arranged between the deck layer and the bottom layer and includes spacer means, which at given distances in relation to each other are connected to the deck layer and the bottom layer, said device comprising a support frame, carrying a first dismantling station, in which a pallet is insertable, wherein said first dismantling station comprises at least one knife, that has an edge, which can be driven in between a chosen spacer means and the deck layer at a chosen outer deck board, in order to separate the spacer means from the deck layer at the specified place, or between a chosen spacer means and the bottom layer at a chosen outer bottom board, in order to separate the spacer means from the bottom layer at the specified place.

PRIOR ART

A device of the kind described above is known e.g. from the document WO 00/78499 A1 and differs thanks to the knife solution in a favorable way from many other devices for dismantling of chosen parts of assembled pallets, said devices using saws instead for separation purposes, which causes dust and noise.

THE OBJECT OF THE INVENTION

The object of the invention is to improve the previously known devices with knifes for dismantling of chosen parts of assembled pallets, such that a more compact, flexible, and especially easier installable device is achieved.

BRIEF SUMMARY OF THE INVENTION

According to the invention this object is achieved in a device according to the preamble in that said support frame also carries a second dismantling station, in which a pallet is insertable, wherein said second dismantling station comprises at least one knife, that has an edge, which can be driven in between a chosen outer spacer means and the deck layer at a chosen central deck board, in order to separate the spacer means from the deck layer at the specified place, or between a chosen spacer means and the bottom layer at a central bottom board, in order to separate the spacer means from the bottom layer at the specified place, and in that a multiple-axle robot is arranged to feed pallets into and out of the device and to position said pallets in relation to the knifes of both dismantling stations of the device.

By, according to the invention, arranging two dismantling stations on the same support frame, it is rendered possible to optimize the positions of the stations in relation to each other and thus to reduce the distance between them. This can lead to an extremely compact solution. By, according to the invention, using a multiple-axle robot for feeding pallets into and out of the device and also for positioning of the pallets in the device, it is rendered possible thanks to the versatility of the robot to achieve a far greater flexibility than before. Hence, it is easily possible to use the device e.g. for different types of pallets. Further, by, according to the invention, arranging the dismantling stations on a single support frame, it is rendered possible to greatly facilitate the local installation of the device and to facilitate the necessary programming of the robot. The latter is due to the known relative positions of the dismantling stations, which means that no local studies have to be carry out regarding possible motion schemes of the robot, such that the robot can be programmed off-line and in advance.

According to a preferred embodiment a stop is arranged opposite the edge of each knife of the first dismantling station, wherein said robot, when positioning a pallet, is arranged to hold it against the stop before the edge of the knife is driven in. This is advantageous because it facilitates correct positioning of the pallet by the robot and because it reduces stresses on the robot during a separation operation.

Preferably the number and placement of the knifes of the first dismantling station corresponds to the number and placement of the spacer means along a bottom board, wherein the knifes are individually controllable. In this way, by adapting the device to the type of pallet to be processed, it is easily rendered possible to reduce the number of necessary movements of a pallet in a device, which is further promoted by means of the individually controllable knifes.

According to a preferred embodiment a stop is arranged opposite the edge of each knife in the second dismantling station, wherein said robot, when positioning a pallet, is arranged to hold the pallet against the stop before the edge of the knife is driven in. This is advantageous due to the fact that it too facilitates correct positioning of the pallet by the robot and that it also reduces stresses on the robot during a separation operation.

In the latter preferred embodiment preferably two knifes are arranged in the second dismantling station, of which the first knife has its edge facing a first stationary stop and of which the second knife has its edge facing in the opposite direction away from the first knife against a second stationary stop, wherein the knifes are individually controllable. This solution is advantageous because it facilitates the insertion of the knifes into the intermediate layer, such that quick access is gained for dismantling of chosen parts of a pallet.

In the latter case, preferably a third stop is insertable between the second knife and the second stop. In some cases the third stop renders it possible to reduce the number of necessary movements of a pallet in the second dismantling station.

According to a preferred embodiment of the invention two position sensors each are arranged in the first and/or the second dismantling station in order to, by an initial skewed insertion of a pallet into the station in question with a deck board or bottom board in front against initially the first position sensor and then the second position sensor, followed by straightening out of the pallet, enable determination of the thickness of a deck board or bottom board and thus appropriate positioning thereof before the edge of a knife is driven in. This motion pattern is very easy to achieve by means of using the robot and rapidly and reliably provides all information necessary in order to arrive at an accurate knife adjustment even when different thickness dimensions are at hand.

According to a particularly preferred embodiment of the invention said support frame also carries said robot. This solution brings about great advantages because it makes the placement of the dismantling stations in relation to the robot become known in advance. This especially facilitates installation and programming of the device, but it can also contribute to further shrinking of the overall dimensions of the device. Moreover, this solution enables supply of the device as a complete unit (a so-called factory in a box) and transfer, too, if necessary.

Preferably the dismantling stations are arranged on top of each other and open at least in a downward direction. Such placement and orientation make the dimensions of the device shrink in a longitudinal and a lateral direction and, most of all, they contribute to parts removed from pallets fall down freely and thus away from the dismantling stations.

Preferably the second dismantling station is placed on top. The advantage is that such a placement makes the second dismantling station, in which parts both from the top and bottom layer can be dismantled, more easily accessible to the robot.

Preferably said robot is placed in front of the dismantling stations. This of course facilitates input and output, but it constitutes too an appropriate way to further shrink the dimensions of the device laterally.

According to a particularly preferred embodiment an output feeder is arranged beneath the dismantling stations in order to feed separated parts out of the device. Thus parts removed from pallets can reliably and permanently be fed out of the device.

For the same reason as above regarding the robot, it is appropriate to let the support frame also carry the output feeder, wherein said output feeder preferably includes a conveyor, that runs away from said robot.

One embodiment of the device is designed specifically for the dismantling of chosen parts of assembled pallets of European type, i.e. pallets that have a deck layer, having at least one central deck board between two outer deck boards, a bottom layer, having a central bottom board between two outer bottom boards, and an intermediate layer, having spacer means comprising nine blocks, which are arranged one at each end of the bottom boards and one centrally on each bottom board, and three parallel stringer boards, which extend transversely with respect to the deck boards and are arranged immediately beneath these on top of said blocks centrally on and at the ends of the bottom boards. According to the embodiment in question the edge of said at least one knife of the first dismantling station can be driven in between a chosen block and stringer board at a chosen outer deck board, in order to separate the block from the stringer board at the specified place, or between a chosen block and a chosen outer bottom board, in order to separate the block from the bottom board at the specified place, wherein the edge of said at least one knife of the second dismantling station can be driven in between a chosen outer stringer board and a chosen deck board, in order to separate the stringer board from the deck board at the specified place, between a chosen block and the central bottom board, in order to separate the block from the bottom panel at the specified place, or between a chosen outer stringer board and a block on top of the central bottom board, in order to separate the block from the stringer board at the specified place. The advantage of such a specific adaptation of the device to a common type of pallet is that dismantling can be speeded up considerably, e.g. in that an outer bottom board is removed in just one operation by means of three knifes, all of them simultaneously dealing with a block of their own.

In the latter embodiment preferably two position sensors each are arranged in the first and/or in the second dismantling station in order to, by initial skewed insertion of a pallet into the station in question with a deck board or a bottom board in front against initially the first and then the second position sensor, followed by straightening out of the pallet, enable determination of the thickness of a deck board, a stringer board or a bottom board and thus appropriate positioning thereof before the edge of a knife is driven in. Once again the motion scheme described is easy to accomplish by means of the robot and renders it possible to rapidly and reliably obtain all necessary information in order arrive at a correct knife adjustment, even when different thickness dimensions are at hand and when said stringer board is involved, too.

According to an embodiment of the device according to the invention said support frame can carry a third dismantling station, in which a pallet is insertable, wherein said third dismantling station comprises an inclined chute, having an upper end edge, that has two arms protruding from a plane of said chute and being arranged to serve as a catch for extracting by means of the robot of a stringer board post separation in the second dismantling station. In other words, the third dismantling station complements the second dismantling station and is used to mechanically remove a separated stringer board, which might otherwise remain in the pallet because of its placement sandwiched between the deck boards and the blocks of the intermediate layer.

Preferably in the latter embodiment, the arms of the third dismantling station can be turned away by means of a common lever, which is controlled by a cylinder assembly. In this way the arms can be moved away in an extremely simple and reliable manner when the services of third dismantling station are not needed.

In order to improve the performance of the third dismantling station, such as when a stringer board is so badly damaged that it has gone to pieces, preferably an projectable pin each is arranged downstream of both arms of the third dismantling station, said pins being projectable from said plane of the chute and being arranged on such a distance from its associated arm that a stringer board inserted in parallel with the upper end edge of the chute fits freely between said arm and said pin but is jammed in-between if skewed during extraction.

BRIEF DESCRIPTION OF THE DRAWINGS

Preferred embodiments of the device according to the invention are described below in detail with reference to the attached drawings, in which.

DETAILED DESCRIPTION OF THE PREFERRED EMBODIMENTS

Figure 1:
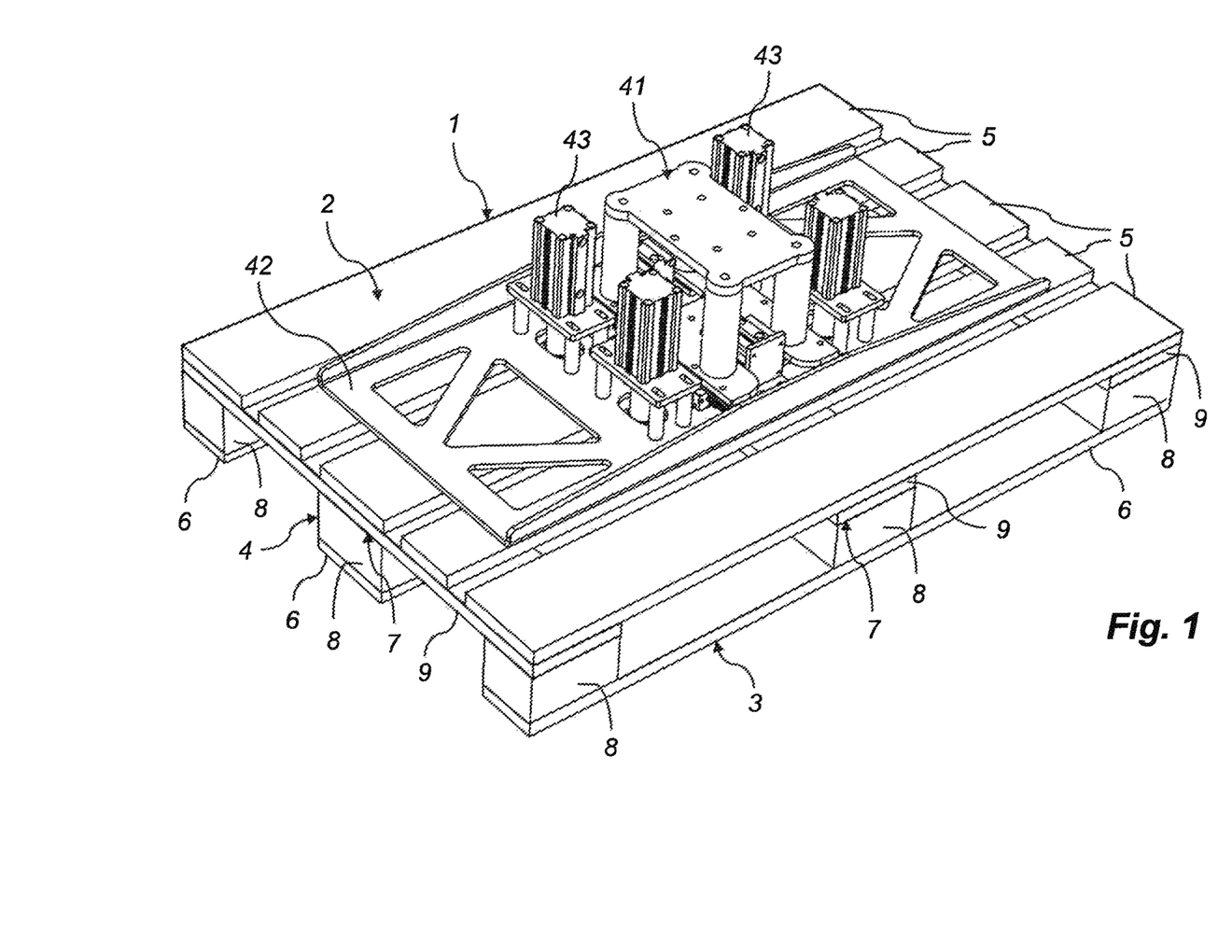
FIG. 1 is a perspective view and shows a pallet of European type together with a gripper suitable for the device according to the invention.

The embodiments described hereinafter of the device 10 according to the invention are intended for dismantling of chosen parts of pallets of European type (c.f. FIG. 1 especially). However, the invention is obviously not limited to such.

The pallet 1 shown in FIG. 1, like other pallets, for which the invention is meant, can roughly be divided into three layers, namely a deck layer 2, a bottom layer 3 in parallel with the deck layer and an intermediate layer 2, that is arranged between the deck layer 2 and the bottom layer 3. In the case shown the deck layer 2 comprises of five parallel deck boards 5, three so-called central ones and outside of these two so-called outer ones. The bottom layer 3 comprises in the case shown of three parallel bottom boards 6, one so-called center one and outside thereof two so-called outer ones. Finally, the intermediate layer 4 comprises in the case shown of three spacer means 7, one so-called center one and outside thereof two so-called outer ones. Each spacer means 7 is in turn divided into three blocks 8, one so-called center one and outside thereof two so-called outer ones, as well as into a stringer board 9, that is arranged between the blocks 8 and the deck boards 5 and extends transversely with respect to these.

The three aforementioned layers 2-4 are normally made of wood and joined through nailing. This means that it is normally possible in a damaged pallet 1 to remove only damaged parts thereof in order to replace them with new parts in a subsequent step and thus to create a refurbished pallet with a proper function. When developing the device 10 according to the invention a careful analysis of the most common defects of pallets 1 was made and it was found that the following parts were the most vulnerable ones and therefore the ones that were to be dismantlable. Said parts are in the deck layer 2 the two outer deck boards 5, in the bottom layer 3 all bottom boards 6 and in the intermediate layer 4 the outer spacer means 7 or in the case particularly shown both the outer stringer boards 9 and the blocks 8 under these as well as the outer blocks 8 under the central stringer board 9. Hence, according to said analysis not particularly vulnerable parts are the central deck boards 5 of the deck layer 2 and the central spacer means 7 of the intermediate layer 4, comprising in the case shown in particular the central stringer board 9 and the central block 8.

Against this background it was decided that when handling a pallet in a device 10 according to the invention, said pallet was at all times to be grabbed at parts that are never involved in any dismantling action, namely the central deck boards 5. Further, it turned out to be most beneficial to grab the pallet 1 from above, i.e. from the deck side, by means of a gripper, generally designated 41 (c.f. FIG. 1). Said gripper preferably comprises a flat base plate 42, that is intended to bear on the central deck boards 5, and four claws (not shown), that engage the underside of the central deck boards 5 and with the aid of hydraulic assemblies 43 clamp those boards against said base plate 42.

Furthermore, it was decided that a multiple-axle robot 40 was to be used for said handling, wherein said robot, when connected to the gripper 41, thanks to its versatility, easily can handle a pallet 1 in a desired manner so that all parts of a pallet 1 being dismantlable according to the above become accessible for a dismantling action without the need to let the gripper 41 change its grip. The combination of a robot 40 and a gripper 41 is shown in FIG. 2, where a pallet 1 is shown too in a clearly skewed mode in order to illustrate part of the freedom of motion that the robot 40 gives rise to.

Figure 2:
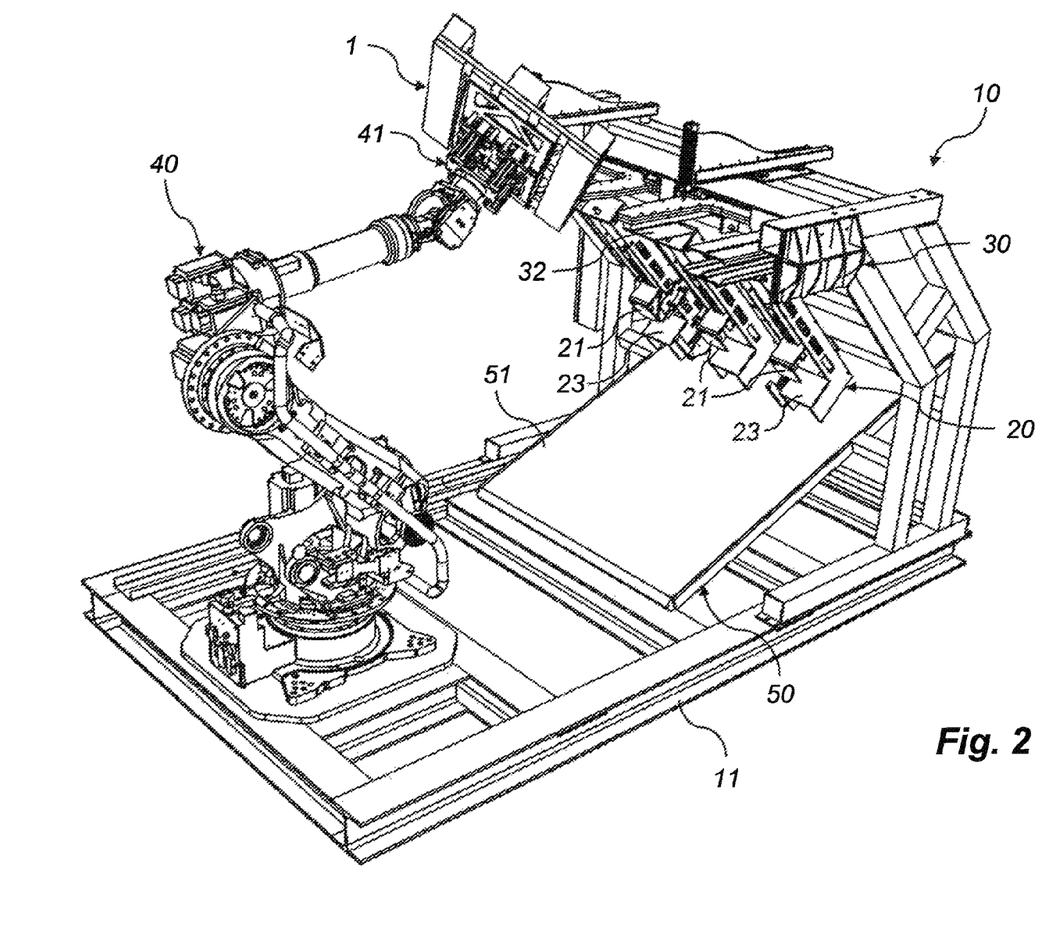
FIG. 2 is a perspective view and shows a first embodiment of the device together with a pallet of said type.

As can be seen the robot 40 of FIG. 2 is mounted on a support frame 11. According to the first embodiment of the device according to the invention, on the same support frame 11 two so-called dismantling stations are to be found, namely a first lower dismantling station 20 and a second upper dismantling station 30. In addition, an output feeder 50, that includes a conveyor 51, is mounted on the support frame 11 under both said dismantling stations 20, 30. The purpose of the output feeder 50 is to use the conveyor belt 51 to catch and feed parts dismantled from pallets out of the device 10, and thus to keep the device free from such parts in order to obtain non-disrupted operation.

The first and, as shown, preferably lower dismantling station 20 comprises three knifes 21, which are arranged in a common plane and at center distances in relation to each other corresponding to the center distances of the three blocks 8 along a bottom board 6 of a pallet 1. As can be seen, the knifes 21 are directed obliquely downwards (c.f. the edges denoted 22) and away from the robot 40 and are arranged opposite one stop 23 each. The robot 40 can hold a pallet 1 against the stops 23 with at least the outside of a bottom board 6 and of the adjacent spacer means 7 (blocks 8), wherein said pallet has its underside facing obliquely upwards and away from the robot 40.

Figure 3:
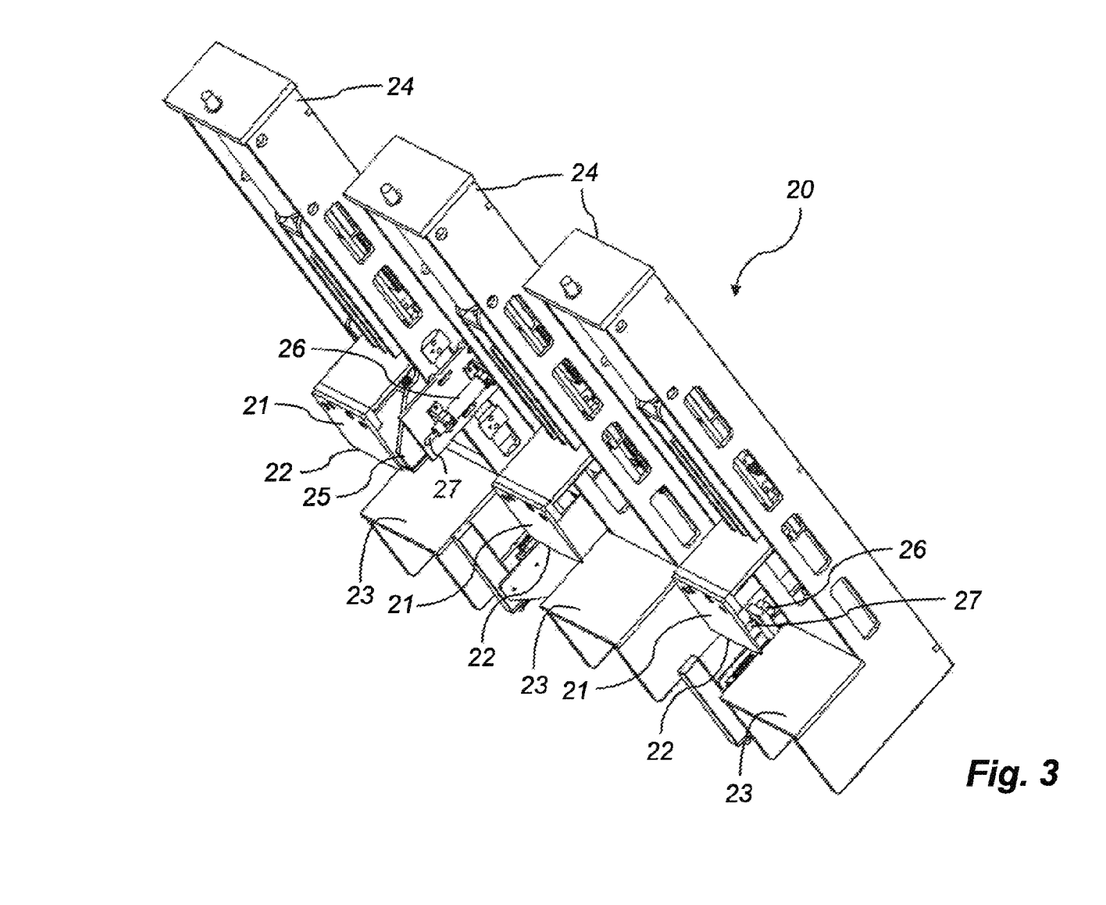
FIG. 3 is a perspective view and shows in detail parts of a first dismantling station according to this embodiment of the device.

In FIG. 3 the first dismantling station 20 is shown in more detail. It is evident that each pair comprising of a knife 21 and a stop 23 is mounted on a common carrier 24. On these carriers 24 the knifes 21 are arranged individually in a hydraulically displaceable way, each combined with an own spring-loaded ejector 25, that is designed to reliably eject a dismantled part of a pallet 1 (i.e. a part separated by means of a knife edge 22) onto the conveyor 51 below.

In order to render it possible to apply a knife edge 22 at a desired place irrespective of occurring thickness variations of pallets 1, the two outer carriers 24 of the first dismantling station 20 each have a position sensor 26. The position sensors 26 have pistons 27, which are directed opposite to the usual insertion direction of pallets 1 into the dismantling station 20 and are arranged such that they when a pallet 1 is inserted into the first dismantling station 20 come into contact with the outer bottom board 5 at hand and such that they when doing so are pushed in and give rise to a corresponding position signal. In this respect, the arrangement is such that the pallet 1 from the beginning by means of the robot 40 is inserted in a skewed way, so that first one and only thereafter the second position sensor 26 is activated, whereupon the pallet is straightened out against the aforementioned stops 23 and is adjusted in height by the robot 40 in relation to the knifes 21, in order to make these exactly to separate a desired part on one of two possible levels of height, namely the joint between an outer bottom board 6 and a block 8 or the joint between a stringer board 9 and a block 8 on top of an outer bottom board 6. In doing so, it is of course possible to have the knifes 21 work together, to separate for instance an outer bottom board 6, or separately, to separate a single block 8 on top of an outer bottom board 6, wherein the latter, after an initial first cut at an outer bottom board 6, of course requires a height displacement by the robot 40 and then a second cut between said block 8 and the stringer board 9 in question.

In summary, it is obvious that this renders it possible to separate and thus dismantle the outer base board 6 and/or one or more blocks 8 on top thereof along a first long side of a pallet 1 when said pallet is inserted in the first dismantling station 20. The corresponding measure for the second long side of the pallet 1 requires rotation of the pallet 180 degrees and then insertion of the other long side into the dismantling station 20.

The second and, as shown, preferably upper dismantling station 30 comprises two knifes only, one so-called first knife 31 and one so-called second knife 32. The knifes 31, 32 are, which is evident from FIG. 4, arranged in a common, substantially horizontal plane and have their knife edges 33, 34 facing away from each other. The distance between the knifes 31, 32 when a pallet is inserted lying down into the second dismantling station 30 is such that the knifes 31, 32 can be inserted between the blocks 8 along an outer bottom board 6. In the second dismantling station 30, too, there is a stationary stop 35, 36 opposite each knife 31, 32. In addition, there is also a movable third stop 37, that is insertable between the second knife 32 and its opposite stationary stop 36. The third stop 37 has a horizontal slot 38, the function of which is described in more detail below.

Figure 4:
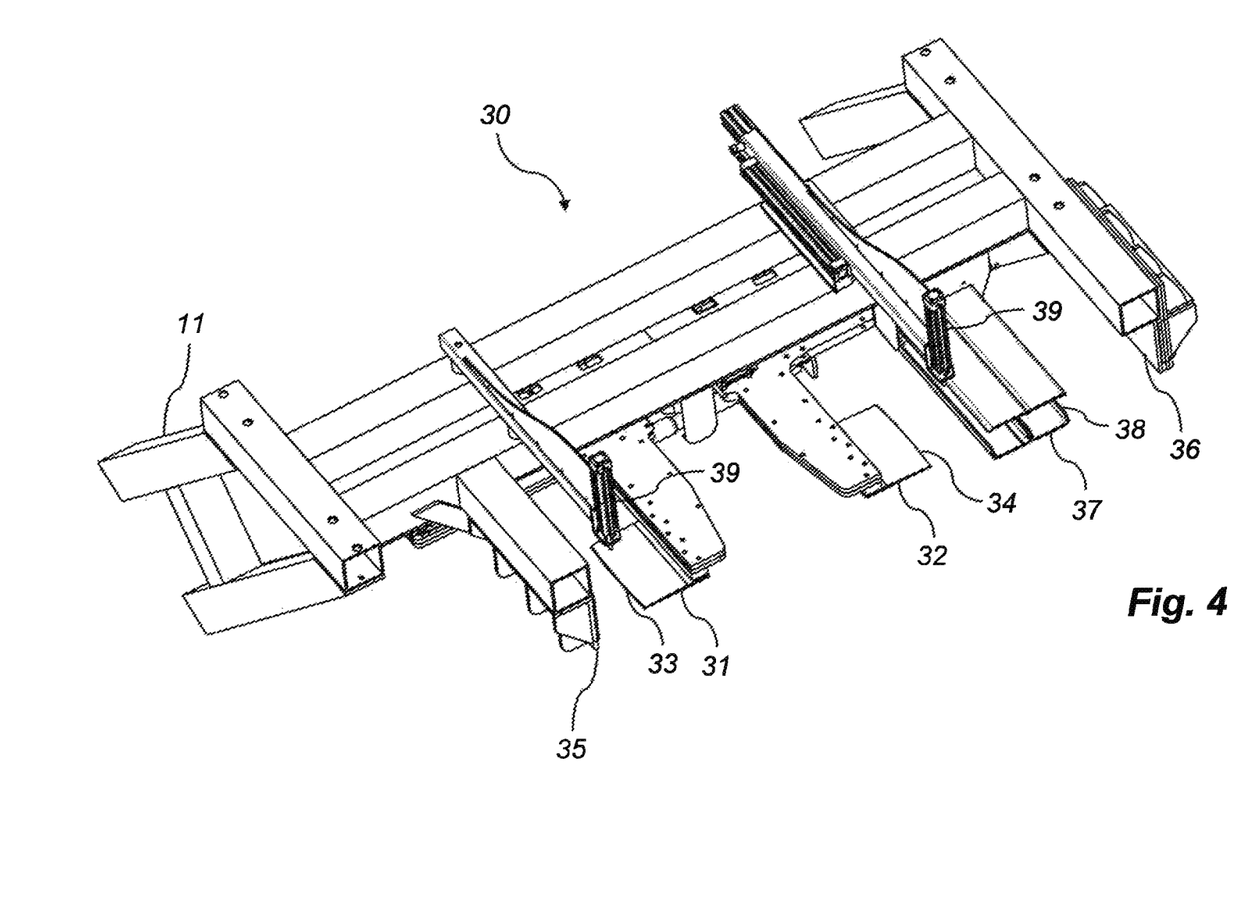
FIG. 4 is a perspective view and shows in detail parts of a second dismantling station according to this embodiment of the device.

To make it possible to apply a knife edge 33, 34 at a desired place regardless of occurring thickness variations of pallets 1, the second dismantling station 30, too, comprises two position sensors 39 of the above-described type. The position sensors 39 have vertically directed pistons (not shown in detail), which are arranged to work according to the above described scheme including initially skewed insertion of a pallet 1.

Figure 5:
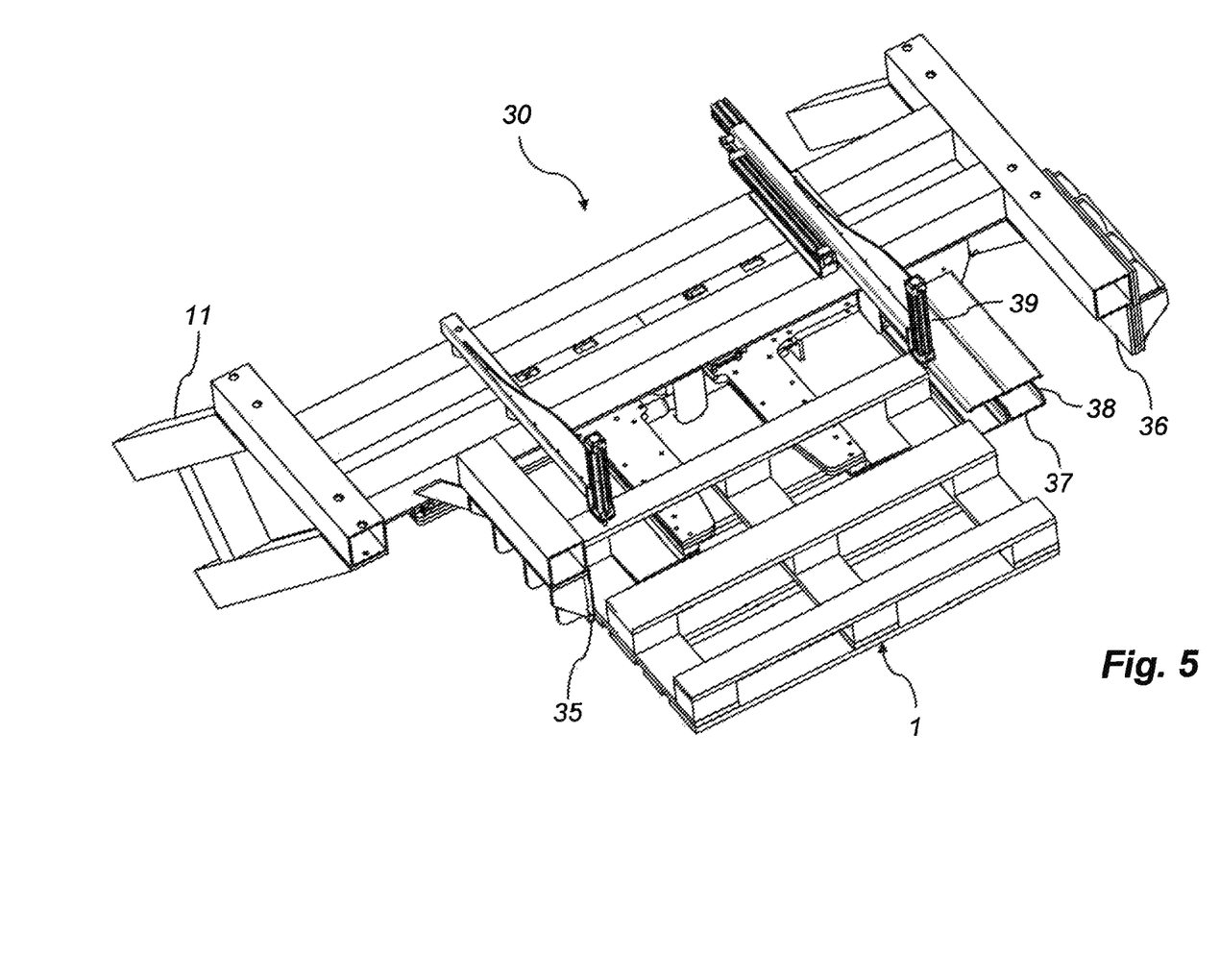
FIG. 5 is a perspective view and shows the second dismantling station with a pallet inserted therein.

Next reference is had in particular to FIG. 5, where a pallet 1 is shown inserted in the second dismantling station 30, however, without the robot 40, which according to the invention manages the handling of the pallet 1. In the dismantling station 30 the pallet 1 apparently first has been turned such that its bottom boards 6 are at the top, whereupon the pallet 1 has been inserted between the stationary stop 35 and the movable, in this case projected stop 37. In the displayed mode, the knifes 31, 32 can separate either the outer stringer boards 9 from the outer blocks 8 on the central bottom board 6 or the outer stringer boards 9 from the deck boards 5 depending on how far the pallet 1 is inserted into the dismantling station 30, on the long side chosen, and on the height level chosen. For the separation of the outer deck boards 5 from the central stringer board 9, however, displacement of the pallet 1 is required, so that one of its short sides abuts the second stationary stop 36 and its central spacer means 7 (block 8 and stringer board 9) abuts the projected stop 37. In doing the deck boards 5 of the pallet 1 run through the recess 38, that was mentioned before and now has been accounted for.

The second dismantling station 30 can also be used for dismantling of the central bottom board 6 and of the outer blocks 8 on top of this board. For such a measure the pallet 1 is first turned so that its deck boards 5 are facing upwards. Then the pallet is inserted between the stationary stop 35 and the movable stop 37 equivalently to FIG. 5, whereupon the knifes 31, 32 are driven in at the desired place. Separation of the central bottom board 6 from the central block 8 requires again a displacement of the pallet 1 as described above, however, this time it is an outer bottom board 6 that runs through the recess 38.

Figure 6:
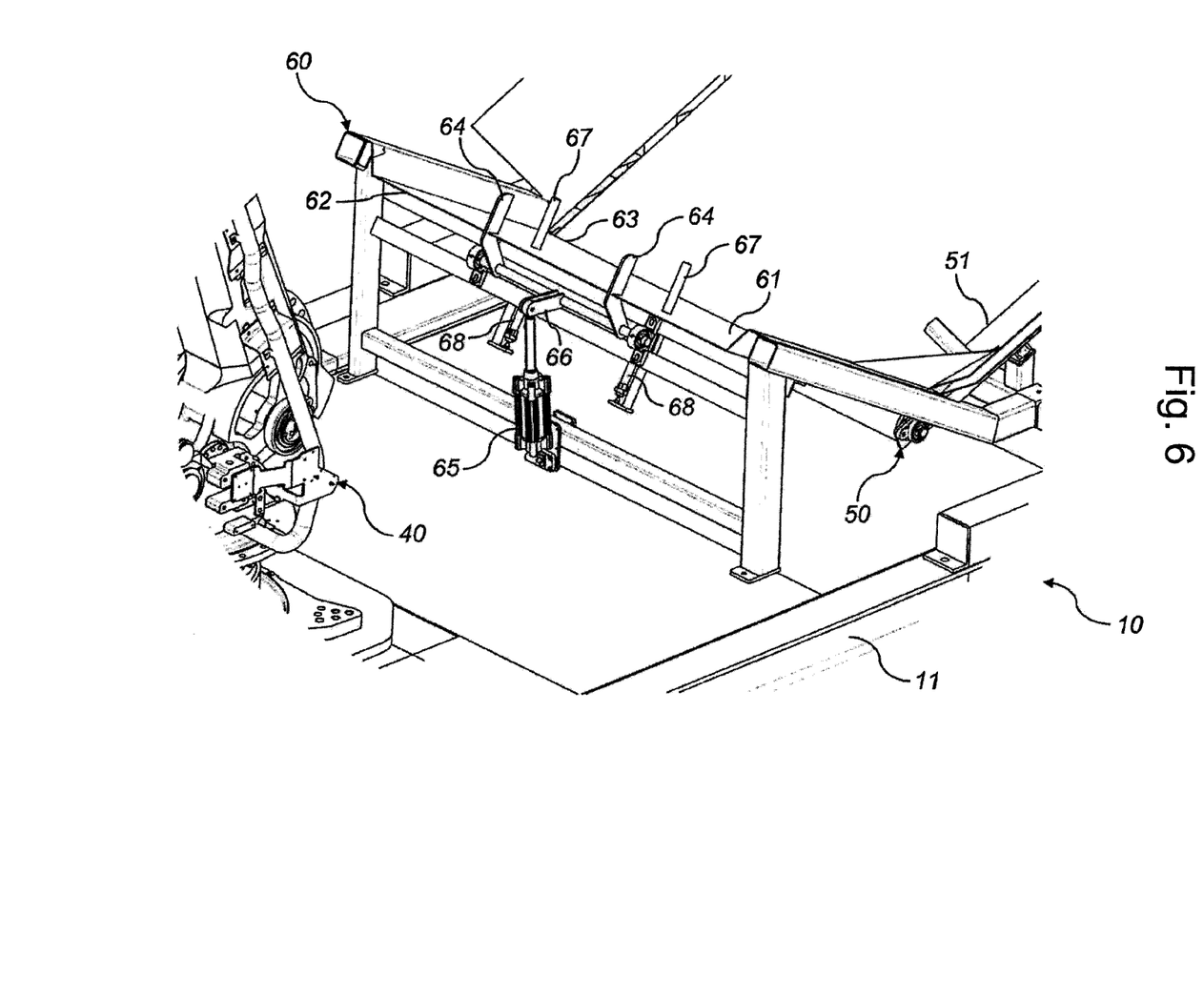
FIG. 6 is a perspective view and shows a portion of a second embodiment of the device.

In FIG. 6 a second embodiment of the device 10 according to invention is shown, wherein the same reference notations have been used to denote parts corresponding to parts of the above-described first embodiment, and below only deviations from the first embodiment are described.

The device 10 of FIG. 6 comprises a third dismantling station 60, in which a pallet 1 is insertable and which, like the other two dismantling stations 20, 30 (not shown in FIG. 6), the robot 40 and the output feeder 50, is carried by the support frame 11 of the device 10. Thus, there the aforementioned advantages of a so-called factory in a box are at hand even with the second embodiment. The third dismantling station 60 comprises an inclined chute 61, that has an upper end edge 62 and a lower end edge 63, that connects to the conveyor 51 of the output feeder 50. Along the upper end edge 62 there are two arms 64 projecting from the plane of the chute 61, wherein said arms can be turned away by means of a cylinder assembly 65, that cooperates with a lever mechanism 66, when services of the third dismantling station 60 are not needed, namely to serve as a catch for extracting by the robot 40 of a stringer board 9, previously separated by means of the second dismantling station 30.

It has shown that such an extraction sometimes can cause problems when a stringer board 9 is badly damaged and for instance has been broken in half. To accommodate for such situations, the third dismantling station beneath said arms 64 has one pin 67 each projectable from the plane of the chute 61. These pins 67 are projectable and retractable by means of a cylinder assembly 68 each, and in their projected mode they are arranged at such a distance from the associated arm 64 that a stringer board 9 inserted in parallel with the upper end edge 62 of the chute 61 fits freely between the arm 64 and the pin 67 but is stopped in-between if the skewed during said extraction, wherein a pulled out stringer board 9 as soon as the pins 67 are withdrawn slides along the chute 61 down to the output feeder 50, by which it is fed out of the device 1.

It is obvious that the above-described embodiments of the device 10 according to the invention can be varied in different ways within the context of the claims such that they optimally fit an intended type of pallet 1. It is obvious, too, that it is appropriate to let a computer control the entire dismantling process such that the actions of the robot 40, the dismantling stations 20, 30, 60 and the output feeder 50 are combined in an effective manner.

The invention claimed is:

1. A device for dismantling of chosen parts of assembled pallets, each comprising a deck layer, which includes parallel deck boards arranged at given distances in relation to each other, a bottom layer, which is in parallel with the deck layer and includes parallel bottom boards, which are arranged at given distances in relation to each other, and an intermediate layer, which is arranged between the deck layer and the bottom layer and includes spacer means, which at given distances in relation to each other are connected to the deck layer and the bottom layer, said device comprising a support frame, carrying a first dismantling station, in which at least one of the assembled pallets is insertable, wherein said first dismantling station comprises at least one knife, that has an edge, which can be driven in between a chosen one of the spacer means and the deck layer at a chosen outer deck board, in order to separate the spacer means from the deck layer at a specified place, or between the chosen one of the spacer means and the bottom layer at a chosen outer bottom board, in order to separate the spacer means from the bottom layer at the specified place, wherein said support frame also carries a second dismantling station, in which a pallet is insertable, wherein said second dismantling station comprises at least one knife, that has an edge, which can be driven in between a chosen outer spacer means and the deck layer at a chosen central deck board, in order to separate the spacer means from the deck layer at the specified place, or between a chosen spacer means and the bottom layer at a central bottom board, in order to separate the spacer means from the bottom layer at the specified place, and wherein a multiple-axle robot is arranged to feed pallets into and out of the device and to position said pallets in relation to the knifes of both dismantling stations of the device.

2. The device according to claim 1, wherein a stop is arranged opposite the edge of each knife of the first dismantling station, and wherein said robot, when positioning a pallet, is arranged to hold it against the stop before the edge of the knife is driven in.

3. The device according to claim 1., wherein the number and placement of the knifes of the first dismantling station corresponds to the number and placement of the spacer means along a bottom board, and wherein the knifes are individually controllable.

4. The device according to claim 1, wherein a stop is arranged opposite the edge of each knife in the second dismantling station, and wherein said robot, when positioning a pallet, is arranged to hold it against the stop before the edge of the knife is driven in.

5. The device according to claim 4, wherein two knifes are arranged in the second dismantling station, of which the first knife has its edge facing a first stationary stop and of which the second knife has its edge facing in the opposite direction away from the first knife against a second stationary stop, and wherein the knifes are individually controllable.

6. The device according to claim 5, wherein a third stop is insertable between the second knife and the second stop.

7. The device according to claim 1, wherein two position sensors each are arranged in the first and/or the second dismantling station in order to, by an initial skewed insertion of a pallet into the station in question with a deck board or bottom board in front against initially the first position sensor and then the second position sensor, followed by straightening out of the pallet, enable determination of the thickness of a deck board or bottom board and thus appropriate positioning thereof before the edge of a knife is driven in.

8. The device according to claim 1, wherein said support frame also carries said robot.

9. The device according to claim 1, wherein the dismantling stations are arranged on top of each other and are open at least in a downward direction.

10. The device according to claim 9, wherein the second dismantling station is placed on top.

11. The device according to claim 9, wherein the robot is placed in front of the dismantling stations.

12. The device according to claim 9, wherein an output feeder is arranged beneath the dismantling stations in order to feed separated parts out of the device.

13. The device according to claim 12, wherein said support frame also carries the output feeder.

14. The device according to claim 12, wherein the output feeder includes a conveyor that runs away from said robot.

15. The device according to claim 1, said device being designed specifically for the dismantling of chosen parts of assembled pallets of European type, i.e. pallets that have a deck layer, having at least one central deck board between two outer deck boards, a bottom layer, having a central bottom board between two outer bottom boards, and an intermediate layer, having spacer means comprising nine blocks, which are arranged one at each end of the bottom boards and one centrally on each bottom board, and three parallel stringer boards, which extend transversely with respect to the deck boards and are arranged immediately beneath these on top of said blocks centrally on and at the ends of the bottom boards, wherein the edge of. said at least one knife of the first dismantling station can be driven in between a chosen block and stringer board at a chosen outer deck board, in order to separate the block from the stringer board at the specified place, or between a chosen block and a chosen outer bottom board, in order to separate the block from the bottom board at the specified place, and wherein the edge of said at least one knife of the second dismantling station can be driven in between a chosen outer stringer board and a chosen deck board, in order to separate the stringer board from the deck board at the specified place, between a chosen block and the central bottom board, in order to separate the block from the bottom panel at the specified place, or between a chosen outer stringer board and a block on top of the central bottom board, in order to separate the block from the stringer board at the specified place.

16. The device according to claim 15, wherein two position sensors each are arranged in the first and/or in the second dismantling station in order to, by initial skewed insertion of a pallet into the station in question with a deck board or a bottom board in front against initially the first and then the second position sensor, followed by straightening out of the pallet, enable determination of the thickness of a deck board, a stringer board or a bottom board and thus appropriate positioning thereof before the edge of a knife is driven in.

17. The device according to claim 15, wherein said support frame carries a third dismantling station, in which a pallet is insertable, wherein said third dismantling station comprises an inclined chute, having an upper end edge, that has two arms protruding from a plane of said chute and being arranged to serve as a catch for extracting by means of the robot of a stringer board post separation in the second dismantling station.

18. The device according to claim 17, wherein the arms of the third dismantling station can be turned away by means of a common lever mechanism, which is controlled by a cylinder assembly.

19. The device according to claim 17, wherein an projectable pin each is arranged downstream of both arms of the third dismantling station, said pins being projectable from said plane of the chute and being arranged on such a distance from its associated arm that a stringer board inserted in parallel with the upper end edge of the chute fits freely between said arm and said pin but is jammed in-between if skew during extraction.

* * * * *